(12) United States Patent
Yone

(10) Patent No.: US 11,986,732 B2
(45) Date of Patent: May 21, 2024

(54) NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

(71) Applicant: NINTENDO CO., LTD., Kyoto (JP)

(72) Inventor: Masami Yone, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/956,388

(22) Filed: Sep. 29, 2022

(65) Prior Publication Data
US 2023/0137647 A1 May 4, 2023

(30) Foreign Application Priority Data
Nov. 2, 2021 (JP) ................. 2021-179135

(51) Int. Cl.
*A63F 13/54* (2014.01)
*A63F 13/2145* (2014.01)
*A63F 13/44* (2014.01)

(52) U.S. Cl.
CPC .......... *A63F 13/54* (2014.09); *A63F 13/2145* (2014.09); *A63F 13/44* (2014.09)

(58) Field of Classification Search
CPC ....... A63F 13/54; A63F 13/2145; A63F 13/44
See application file for complete search history.

(56) References Cited

U.S. PATENT DOCUMENTS

| | | | |
|---|---|---|---|
| 9,760,241 B1 * | 9/2017 | Lewbel | G06F 1/1684 |
| 2006/0015903 A1 * | 1/2006 | MacBeth | H04N 7/163 |
| | | | 725/39 |
| 2007/0263015 A1 * | 11/2007 | Ketola | G06F 3/0362 |
| | | | 345/684 |
| 2008/0319734 A1 * | 12/2008 | Kim | G06F 9/454 |
| | | | 704/8 |
| 2009/0121903 A1 | 5/2009 | Misage | |
| 2009/0125811 A1 * | 5/2009 | Bethurum | G06F 3/0485 |
| | | | 715/863 |

(Continued)

FOREIGN PATENT DOCUMENTS

| | | |
|---|---|---|
| JP | 2001-051759 | 2/2001 |
| JP | 2011-254368 | 12/2011 |

*Primary Examiner* — Daniel Samwel
(74) *Attorney, Agent, or Firm* — Nixon & Vanderhye, PC

(57) ABSTRACT

Provided is a new information processing apparatus that emits an operation sound during an operation on a plurality of GUI components. The information processing apparatus comprises: an input detection unit for detecting primary input and secondary input to each of a plurality of buttons displayed on a screen; an operation sound output unit for outputting an operation sound in time with the primary input to one of the plurality of buttons; and a process execution unit for, when the secondary input to the button to which the primary input has been given is detected, executing a process that is assigned to the button and is different from the outputting of the operation sound, where the operation sound output unit raises the pitch of the output operation sound higher as the detection interval of the primary input to different buttons of the plurality of buttons becomes shorter.

14 Claims, 12 Drawing Sheets

(56) References Cited

U.S. PATENT DOCUMENTS

| | | | |
|---|---|---|---|
| 2013/0058321 A1* | 3/2013 | Hamazaki | H04N 21/812 370/338 |
| 2014/0002390 A1* | 1/2014 | Lee | G06F 3/041 345/173 |
| 2014/0206422 A1* | 7/2014 | Abe | A63F 13/814 463/7 |
| 2015/0193137 A1* | 7/2015 | Schimon | G06F 3/0488 715/833 |
| 2017/0068511 A1* | 3/2017 | Brown | G06F 3/04847 |

* cited by examiner

US 11,986,732 B2

NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

CROSS REFERENCE TO RELATED APPLICATION

This nonprovisional application is based on Japanese Patent Application No. 2021-179135 filed with the Japan Patent Office on Nov. 2, 2021, the entire contents of which are hereby incorporated by reference.

FIELD

The present disclosure relates to a graphical user interface (GUI) technique.

BACKGROUND AND SUMMARY

User interfaces having icons, buttons, subwindows, and the like displayed on a screen have conventionally been used for computers, video games, and the like. Techniques to output an operation sound in response to an operation in such user interfaces are also known.

Japanese Patent Laid-Open Application No. 2001-51759 discloses an apparatus for producing an operation sound that enhances a sense of reality and naturalness in object operations. Japanese Patent Laid-Open Application No. 2001-51759 describes outputting a dragging sound such as "zuzuzuzu" in response to a drag of an icon with a mouse or a touch panel. The document also describes changing the timbre and pitch of the dragging sound in accordance with the speed of the drag.

In the conventional techniques to emit operation sounds, each operation sound would be related to each operation object in such a way that this timbre is used when this button is touched and this sound is emitted when this icon is dragged.

A purpose of the present technique made in view of the above-mentioned background is to provide a new non-transitory storage medium having an information processing program stored therein, information processing apparatus, and information processing method for outputting an operation sound.

A non-transitory storage medium according to one aspect has an information processing program stored therein, and the information processing program is executed in a computer of an information processing apparatus and causes the computer to function as: input detection means for detecting primary input and secondary input to each of a plurality of GUI components; operation sound output means for outputting an operation sound in time with the primary input to one of the plurality of GUI components; and process execution means for, when the secondary input to the GUI component to which the primary input has been given is detected, executing a GUI-component-assigned process that is assigned to the GUI component and is different from the outputting of the operation sound, where the operation sound output means outputs the operation sound at a higher pitch as a detection interval of the primary input to different GUI components of the plurality of GUI components becomes shorter.

BRIEF DESCRIPTION OF THE DRAWINGS

FIG. 7B shows an example of the screen where a button "Item A" is focused on.

DETAILED DESCRIPTION OF NON-LIMITING EXAMPLE EMBODIMENTS

Figure 1:
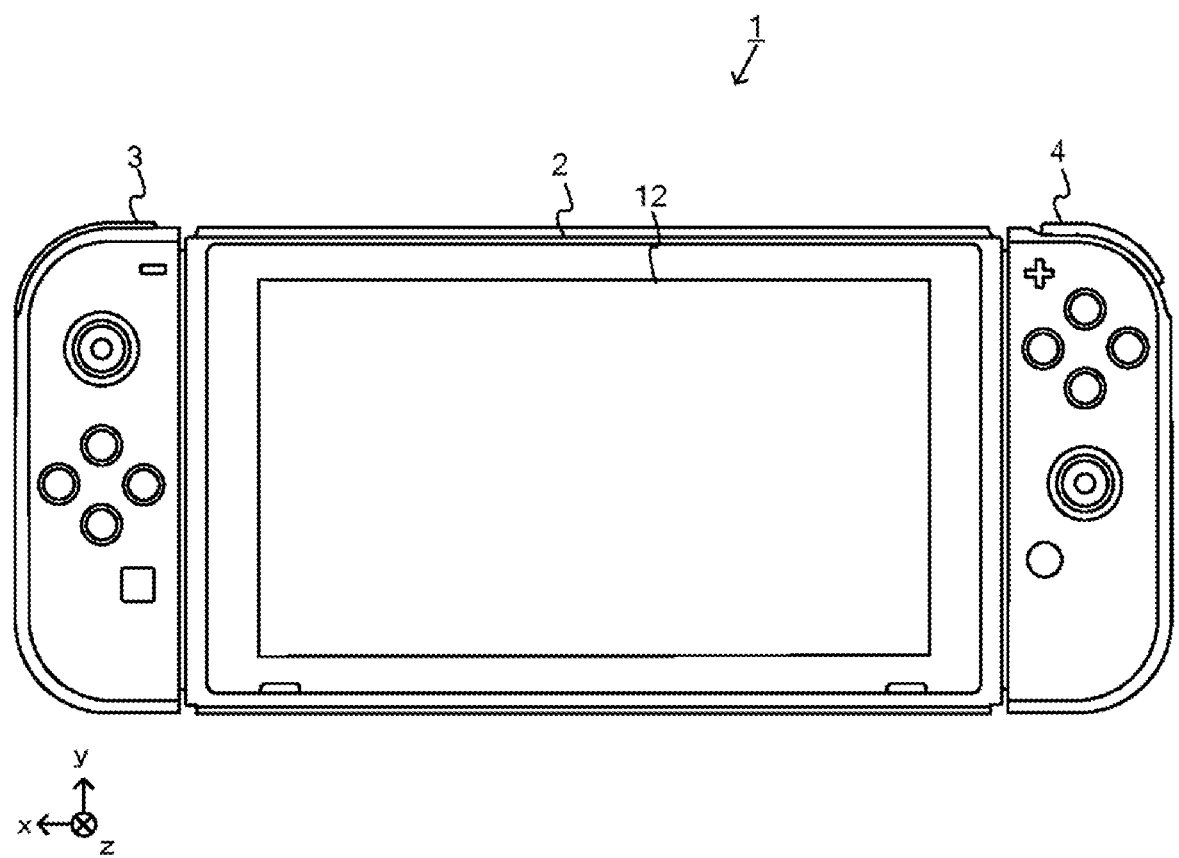
FIG. 1 shows an example of a state in which a left controller and a right controller are attached to a game apparatus of an embodiment.

Now, a non-transitory storage medium having an information processing program stored therein, an information processing apparatus, and an information processing method of the embodiment will be described with reference to the drawings. The following description is merely illustrative of preferred modes and is not intended to limit the invention described in the claims.

A non-transitory storage medium according to one aspect has an information processing program stored therein, and the information processing program is executed in a computer of an information processing apparatus and causes the computer to function as: input detection means for detecting primary input and secondary input to each of a plurality of GUI components; operation sound output means for outputting an operation sound in time with the primary input to one of the plurality of GUI components; and process execution means for, when the secondary input to the GUI component to which the primary input has been given is detected, executing a GUI-component-assigned process that is assigned to the GUI component and is different from the outputting of the operation sound, where the operation sound output means outputs the operation sound at a higher pitch as a detection interval of the primary input to different GUI components of the plurality of GUI components becomes shorter.

"GUI components" are components used in an interface that allows visual understanding of commands, instructions, or the like for a computer and specifying of actions.

Examples of GUI components include a button, an application icon, or the like displayed on a screen. A "GUI-component-assigned process" is a process to be performed by confirming the selection of a GUI component. For example, when a GUI component is an application icon, the execution of the application indicated by the icon is the GUI-component-assigned process. When a GUI component is a button, a transition to the next screen indicated by the button is the GUI-component-assigned process.

Since the operation sound is output at a higher pitch when the primary input is successively given to each of the plurality of GUI components, an operation sound different from that for a single GUI component can be produced, and the operational feeling can be improved. As for the configuration in which the operation sound is output at a higher pitch as a detection interval of the primary input becomes shorter, a configuration in which the pitch is raised when the detection interval is shorter than a predetermined threshold may be used. This configuration allows the pitch of the operation sound to be raised cumulatively when the detection interval remains shorter than the predetermined threshold. A configuration in which the pitch is determined in accordance with the detection interval when it is short may also be used. This configuration allows the pitch of the operation sound to be raised as the detection interval becomes shorter. The pitch may be raised either stepwise or continuously.

The primary input and the secondary input may both be given by a touch input, and the input detection means may detect the primary input when coordinates of the touch input become included in one of the plurality of GUI components' own areas, and may detect the secondary input when coordinates of the touch input at an end thereof are included in one of the plurality of GUI components' own areas. This configuration allows detecting the primary input successively and outputting the operation sound at a higher pitch by moving the touch input between the plurality of GUI components' own areas. Moreover, by ending the touch input within one of the GUI components' own area, the GUI-component-assigned process for the GUI component can be executed.

The primary input and the secondary input may both be given by actuating a hardware component, and the computer may be further caused to function as focus change means for, when the primary input is detected, changing the GUI component to be focused on among the plurality of GUI components as well as displaying the focused GUI component visually differently from an unfocused GUI component. This configuration allows detecting the primary input successively and outputting the operation sound at a higher pitch by actuating a hardware component.

The input detection means may detect a Type 1 input given by using a first input apparatus and a Type 2 input given by using a second input apparatus, and the operation sound output means may output the operation sound that is different in at least one of pitch and timbre between when the primary input of Type 1 based on the Type 1 input is detected and when the primary input of Type 2 based on the Type 2 input is detected. This configuration allows different operation sounds produced by different input apparatuses to be enjoyed.

The Type 1 input may be a touch input and the Type 2 input may be given by actuating a hardware component. Then, the operation sound output means may output the operation sound at a lower pitch when the primary input of Type 2 is detected compared to when the primary input of Type 1 is detected at the detection interval equal to that of the primary input of Type 2.

When input is given by actuating a hardware component, the primary input to a GUI component may be done more unconsciously compared to when the input is a touch input. For example, when the interface uses a hardware button that moves a cursor from right to left or up and down, an unintended GUI component is sometimes selected before an intended one is selected. When the input is given by actuating a hardware component, a feeling of strangeness about a change in pitch can be reduced by setting the pitch lower than when the input is a touch input.

The input detection means may successively detect the primary input to each of the plurality of GUI components when one operation is continued in the input given by actuating a hardware component. The phrase "when one operation is continued" means, for example, when a hardware button is held down and when an analog stick is kept tilted. This configuration allows the detection interval of the primary input to be shortened easily even when the input is given by actuating a hardware component.

The process execution means may change the screen to a state in which no input is allowed to be given to the GUI component, as the GUI-component-assigned process.

When the secondary input to one of the plurality of GUI components is detected, the process execution means may cause the screen on which the GUI component is placed to transition to another screen so as to change the screen to a state in which no input is allowed to be given to the GUI component.

When the secondary input to one of the plurality of GUI components is detected, the process execution means may overlay another screen on a layer in which the GUI component is placed so as to change the screen to a state in which no input is allowed to be given to the GUI component.

An information processing apparatus according to one aspect comprises: input detection means for detecting primary input and secondary input to each of a plurality of GUI components; operation sound output means for outputting an operation sound in time with the primary input to one of the plurality of GUI components; and process execution means for, when the secondary input to the GUI component to which the primary input has been given is detected, executing a GUI-component-assigned process that is assigned to the GUI component and is different from the outputting of the operation sound, where the operation sound output means outputs the operation sound at a higher pitch as a detection interval of the primary input to different GUI components of the plurality of GUI components becomes shorter. The information processing apparatus of the embodiment can comprise the various constituent components of the above-described information processing program.

An information processing method according to one aspect is for outputting an operation sound in time with an input to a GUI component, and the information processing method comprises the steps of: detecting primary input and secondary input to each of a plurality of GUI components; outputting an operation sound in time with the primary input to one of the plurality of GUI components; and when the secondary input to the GUI component to which the primary input has been given is detected, executing a GUI-component-assigned process that is assigned to the GUI component and is different from the outputting of the operation sound, where, in the step of outputting the operation sound, the operation sound is output at a higher pitch as a detection interval of the primary input to different GUI components of the plurality of GUI components becomes shorter. The information processing method of the embodiment can comprise the various constituent components of the above-described information processing program.

Hereinafter, an information processing program, an information processing apparatus, and an information processing method of the present embodiment will be described with reference to the drawings. While a game system is cited and described here as an example of the information processing apparatus, the information processing apparatus of the embodiment is not limited to a game system, but can also be applied to a smartphone, a tablet terminal, a navigation apparatus, or the like.

An example of a game system 1 in the present embodiment includes a game apparatus 2, a left controller 3, and a right controller 4. The left controller 3 and the right controller 4 can be individually attached to and detached from the game apparatus 2. In other words, the game system 1 can be used as an integrated apparatus by attaching the left controller 3 and the right controller 4 individually to the game apparatus 2. Alternatively, the game system 1 can be used in a state where the game apparatus 2, the left controller 3, and the right controller 4 are separated from one another (refer to FIG. 2). In the following, a hardware configuration of the game system 1 of the present embodiment will be described first, and then the control of the game system 1 of the present embodiment will be described.

FIG. 1 shows an example of a state in which the left controller 3 and the right controller 4 are attached to the game apparatus 2. As illustrated in FIG. 1, the left controller 3 and the right controller 4 are individually attached to and integrated with the game apparatus 2. The game apparatus 2 is an information processing apparatus for executing various types of processing (e.g., game processing) in the game system 1. The game apparatus 2 has a display 12. Each of the left controller 3 and the right controller 4 is an apparatus having an operation unit for a user to perform input.

Figure 2:
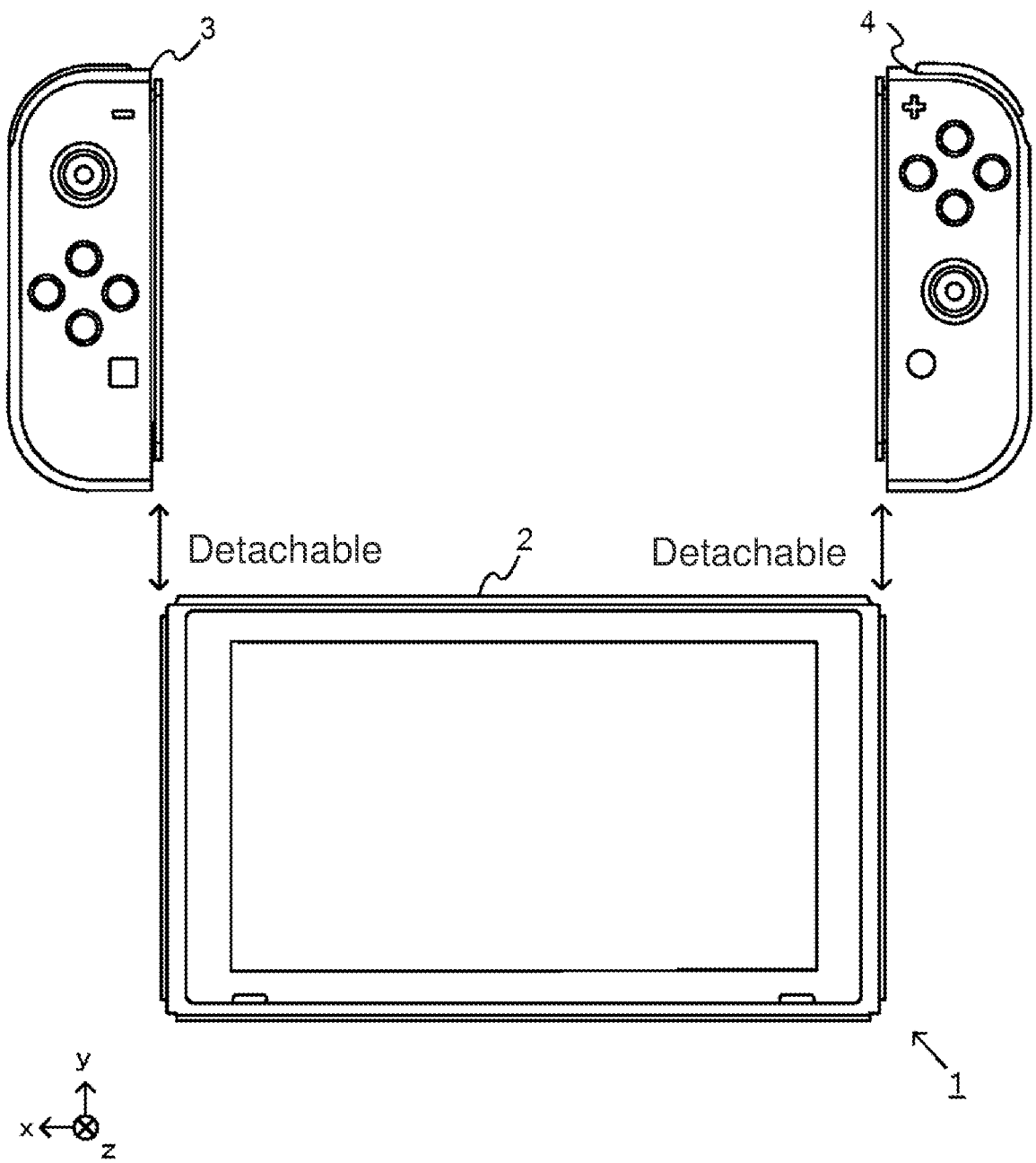
FIG. 2 shows an example of a state in which the left controller and the right controller are each individually from the game apparatus of the embodiment.

FIG. 2 shows an example of a state in which the left controller 3 and the right controller 4 are individually removed from the game apparatus 2. As illustrated in FIGS. 1 and 2, the left controller 3 and the right controller 4 can be attached to and detached from the game apparatus 2. In the following description, the left controller 3 and the right controller 4 will be collectively referred to as the "controller" in some cases.

Figure 3:
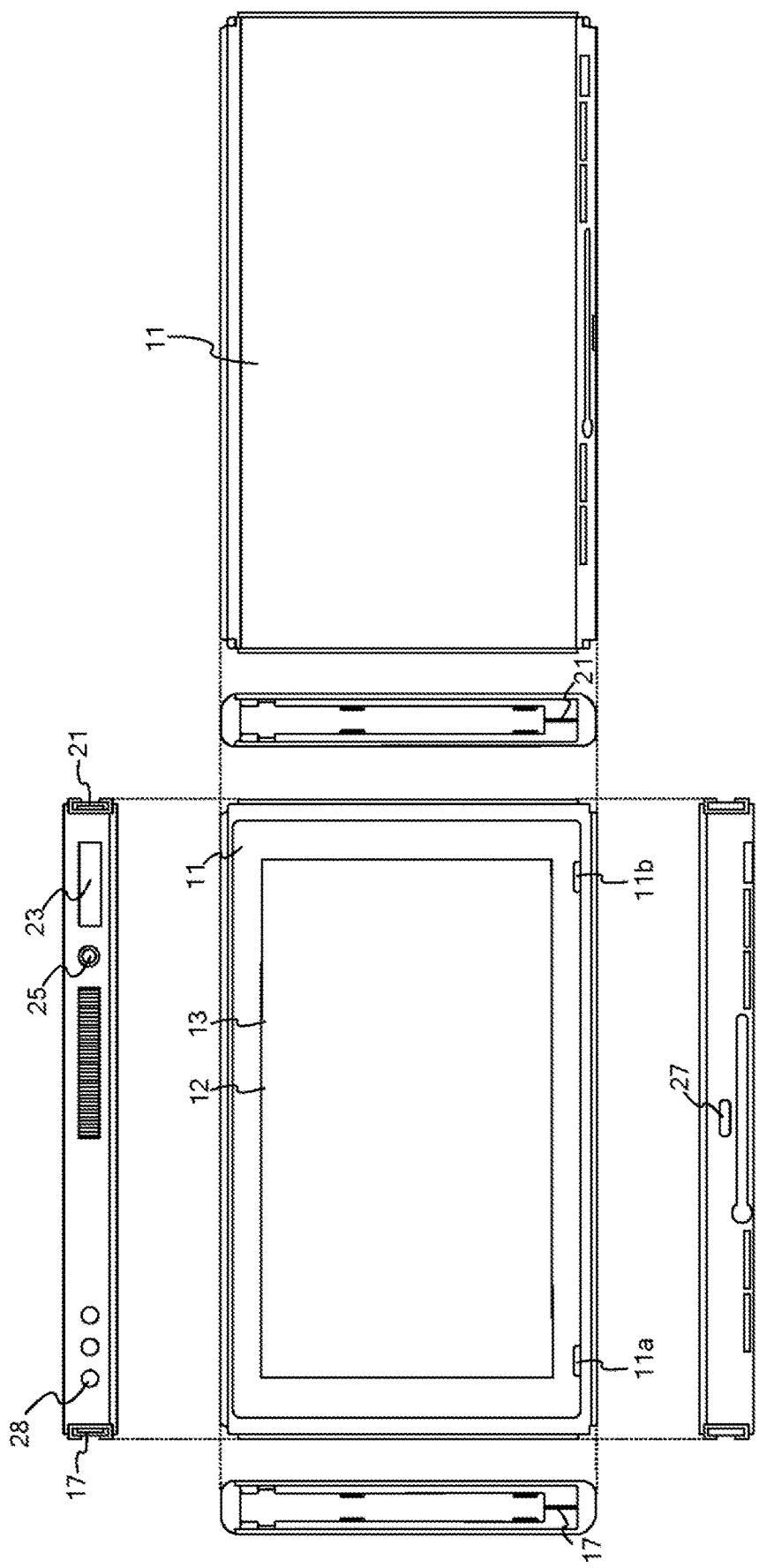
FIG. 3 is a six-view drawing showing an example of the game apparatus of the embodiment.

FIG. 3 is a six-view drawing illustrating an example of the game apparatus 2. As illustrated in FIG. 3, the game apparatus 2 has a plate-like housing 11. In the present embodiment, a main surface of the housing 11 (in other words, the front side, that is, the surface on which the display 12 is provided) is substantially rectangular in shape.

The shape and size of the housing 11 are arbitrary. For example, the housing 11 may be of a portable size. Moreover, the game apparatus 2 alone or the integrated apparatus in which the left controller 3 and the right controller 4 are attached to the game apparatus 2 may be a portable apparatus. The game apparatus 2 or the integrated apparatus may be a handheld apparatus. The game apparatus 2 or the integrated apparatus may also be a transportable apparatus.

As illustrated in FIG. 3, the game apparatus 2 has the display 12 provided on the main surface of the housing 11. The display 12 displays an image generated by the game apparatus 2. In the present embodiment, the display 12 is a liquid crystal display (LCD). Note that the display 12 may be any type of display apparatus.

The game apparatus 2 has a touch panel 13 on a screen of the display 12. In the present embodiment, the touch panel 13 is of a type capable of multi-touch input (e.g., a capacitive type). Note that the touch panel 13 may be of any kind such as a type capable of single touch input (e.g., a resistive type).

The game apparatus 2 has a speaker (i.e., a speaker 80 illustrated in FIG. 6) inside the housing 11. As illustrated in FIG. 3, speaker holes 11a and 11b are formed on the main surface of the housing 11. The output sound of the speaker 80 is output from each of the speaker holes 11a and 11b.

The game apparatus 2 has a left side terminal 17 for performing wired communication with the left controller 3, and a right side terminal 21 for performing wired communication with the right controller 4.

As illustrated in FIG. 3, the game apparatus 2 has a slot 23. The slot 23 is provided on the upper surface of the housing 11. The slot 23 has a shape that enables a predetermined type of storage medium to be attached. The predetermined type of storage medium is, for example, a storage medium (e.g., a dedicated memory card) dedicated to the game system 1 and information processing apparatuses of the same type as the game system 1. The predetermined type of storage medium is used for storing, for example, data used in the game apparatus 2 (e.g., saved data of an application) and/or a game program of the present embodiment executed in a computer of the game apparatus 2. The game apparatus 2 also has a power button 28.

The game apparatus 2 has a lower terminal 27. The lower terminal 27 is used by the game apparatus 2 to communicate with a cradle. In the present embodiment, the lower terminal 27 is a USB connector (more specifically, a female connector). When the above-described integrated apparatus or the game apparatus 2 alone is mounted on the cradle, the game system 1 can display an image generated and output by the game apparatus 2 on a stationary monitor. Moreover, in the present embodiment, the cradle has a function to charge the above-described integrated apparatus or the game apparatus 2 alone mounted on the cradle. The cradle also has a function of a hub apparatus (specifically, a USB hub).

Figure 4:
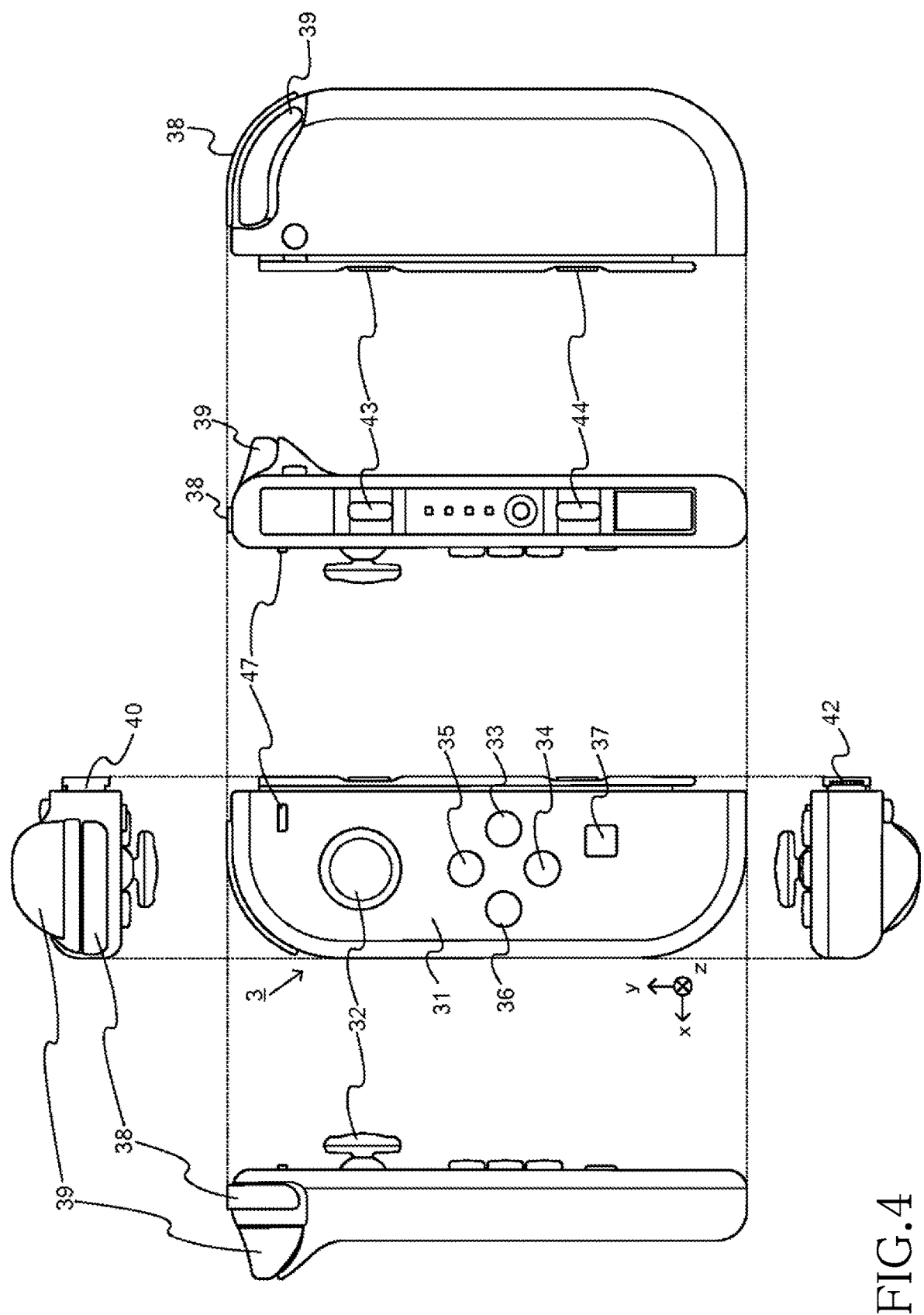
FIG. 4 is a six-view drawing showing an example of the left controller of the embodiment.

FIG. 4 is a six-view drawing illustrating an example of the left controller 3. As illustrated in FIG. 4, the left controller 3 has a housing 31. In the present embodiment, the housing 31 has a vertically long shape, that is, a long shape in the vertical direction (i.e., in the y-axis direction illustrated in FIGS. 1 and 4). The left controller 3 can also be held in a vertically long orientation in a state where it is detached from the game apparatus 2. The housing 31 has a shape and size that can be held with one hand, in particular with the left hand, when held in a vertically long orientation. Moreover, the left controller 3 can also be held in a landscape orientation. When held in a landscape orientation, the left controller 3 may be held with both hands.

The left controller 3 has an analog stick 32. As illustrated in FIG. 4, the analog stick 32 is provided on the main surface of the housing 31. The analog stick 32 can be used as a direction input unit capable of inputting a direction. By tilting the analog stick 32, a user can input a direction corresponding to the tilt direction (and a size corresponding to the tilt angle). Instead of the analog stick, the left controller 3 may be provided with a cross key, a slide stick capable of slide input, or the like as the direction input unit. Moreover, input can be given by pressing the analog stick 32 in the present embodiment.

The left controller 3 has various operation buttons. The left controller 3 has four operation buttons 33 to 36 (specifically, a right button 33, a down button 34, an up button 35, and a left button 36) on the main surface of the housing 31. Moreover, the left controller 3 has a recording button 37 and a − (minus sign) button 47. The left controller 3 has a first L button 38 and a ZL button 39 on the upper left of the side of the housing 31. The left controller 3 also has a second L button 43 and a second R button 44 on the housing 31's side which is to engage with the game apparatus 2 when the left controller 3 is attached to the game apparatus 2. These operation buttons are used to give instructions according to various programs (e.g., an OS program and a game program) executed by the game apparatus 2. Furthermore, the left controller 3 has a terminal 42 for performing wired communication with the game apparatus 2.

Figure 5:
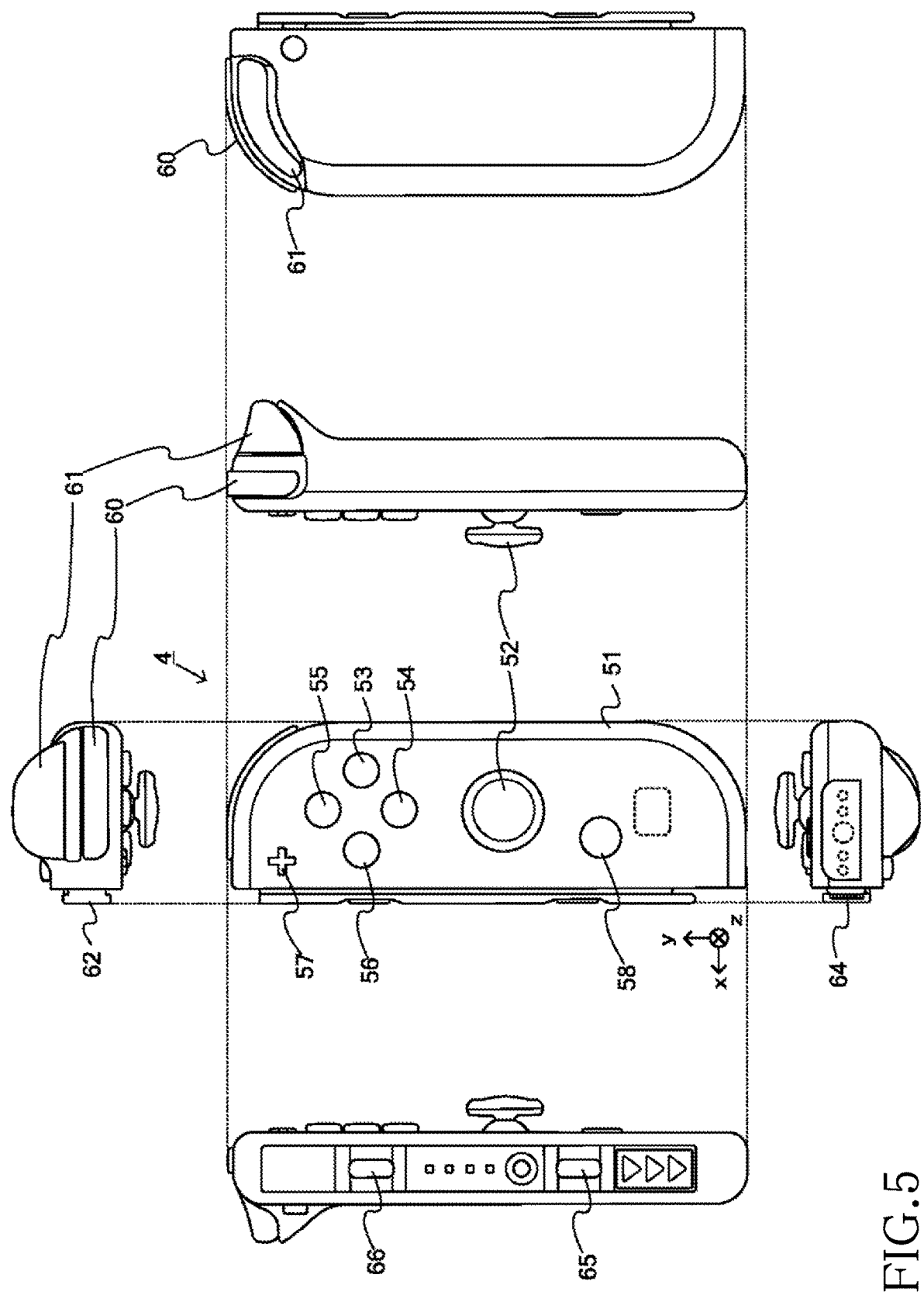
FIG. 5 is a six-view drawing showing an example of the right controller of the embodiment.

FIG. 5 is a six-view drawing illustrating an example of the right controller 4. As illustrated in FIG. 5, the right controller 4 has a housing 51. In the present embodiment, the housing 51 has a vertically long shape, that is, a long shape in the vertical direction. The right controller 4 can also be held in a vertically long orientation in a state where it is detached from the game apparatus 2. The housing 51 has a shape and size that can be held with one hand, in particular with the right hand, when held in a vertically long orientation. Moreover, the right controller 4 can also be held in a landscape orientation. When held in a landscape orientation, the right controller 4 may be held with both hands.

Similarly to the left controller 3, the right controller 4 has an analog stick 52 as a direction input unit. In the present embodiment, the analog stick 52 has the same configuration as the analog stick 32 of the left controller 3. Instead of the analog stick 52, the right controller 4 may be provided with a cross key, a slide stick capable of slide input, or the like. Similarly to the left controller 3, the right controller 4 has four operation buttons 53 to 56 (specifically, an A button 53, a B button 54, an X button 55, and a Y button 56) on the main surface of the housing 51. Moreover, the right controller 4 has a + (plus sign) button 57 and a home button 58. The right controller 4 also has a first R button 60 and a ZR button 61 on the upper right of the side of the housing 51. Similarly to the left controller 3, the right controller 4 has a second L button 65 and a second R button 66. Furthermore, the right controller 4 has a terminal 64 for performing wired communication with the game apparatus 2.

(Configurations to Output the Operation Sound)

Figure 6:
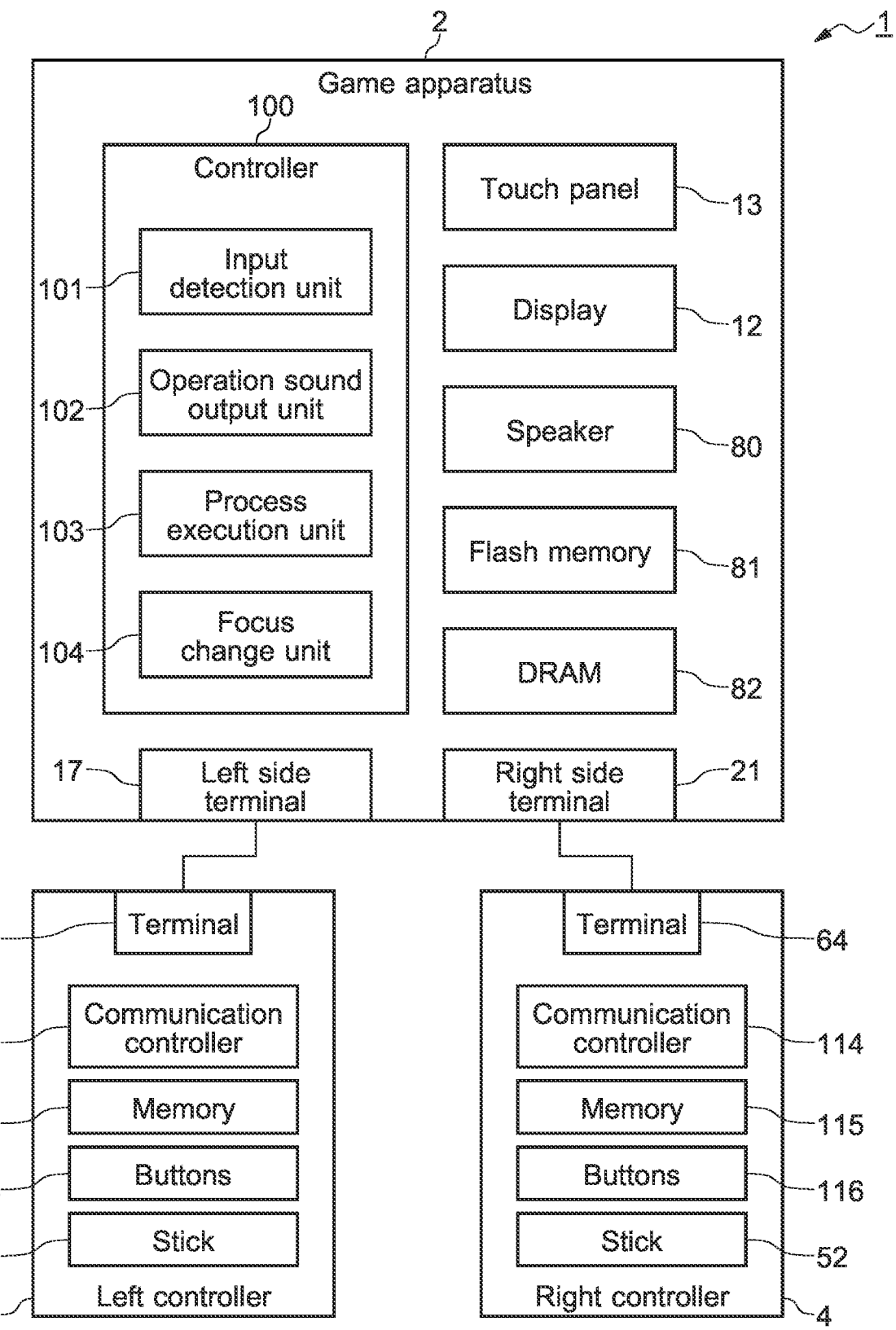
FIG. 6 is a block diagram showing a configuration of a game system implemented by executing an information processing program of the embodiment.

FIG. 6 is a block diagram showing a configuration of the game system 1 implemented by executing the information processing program of the embodiment. FIG. 6 just shows a configuration required to describe the information processing program of the embodiment, and the game system 1 may have a configuration other than the one shown in FIG. 6.

The left controller 3 comprises a communication controller 111 for communicating with the game apparatus 2, a memory 112, buttons 113 (specifically, the above-mentioned buttons 33 to 39, 43, 44, and 47), and the analog stick (denoted by "Stick" in FIG. 6) 32. The buttons 113 and the analog stick 32 output information on operations performed on themselves to the communication controller 111 in a timely manner and repeatedly. The communication controller 111 sends the information on operations to the game apparatus 2.

The right controller 4 comprises a communication controller 114 for communicating with the game apparatus 2, a memory 115, buttons 116 (specifically, the above-mentioned buttons 53 to 58, 60, 61, 65, and 66), and the analog stick 52. The buttons 116 and the analog stick 52 output information on operations performed on themselves to the communication controller 114 in a timely manner and repeatedly. The communication controller 114 sends the information on operations to the game apparatus 2.

The information processing program is stored in an internal storage medium, such as a flash memory 81 and a DRAM 82, of the game apparatus 2, an external storage medium that is attached to the slot 23, or the like. The execution of the information processing program causes a controller 100 to function as an input detection unit 101, an operation sound output unit 102, a process execution unit 103, and a focus change unit 104.

Figure 7A:
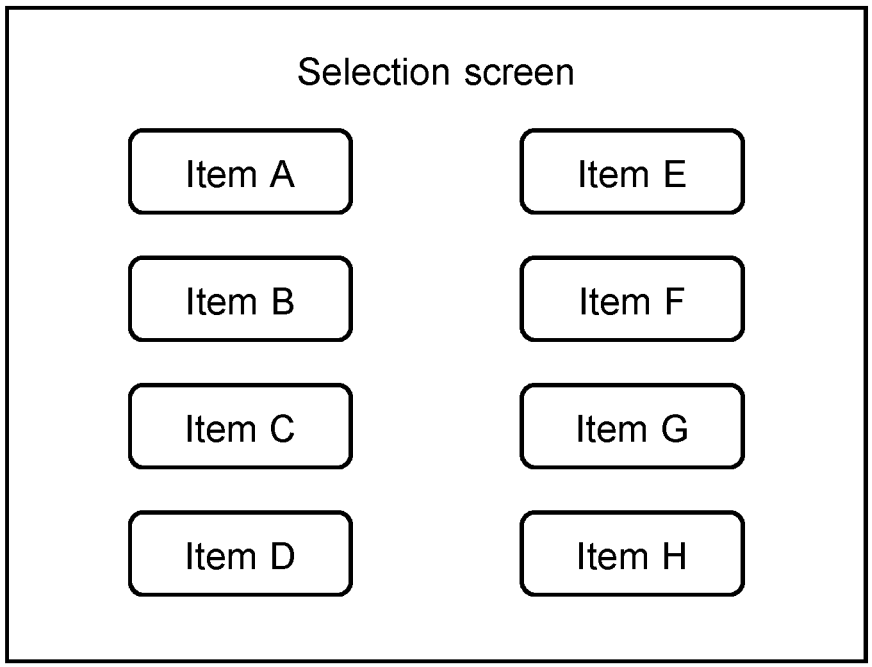
FIG. 7A shows an example of a selection screen displayed on the game apparatus.
Figure 7B:
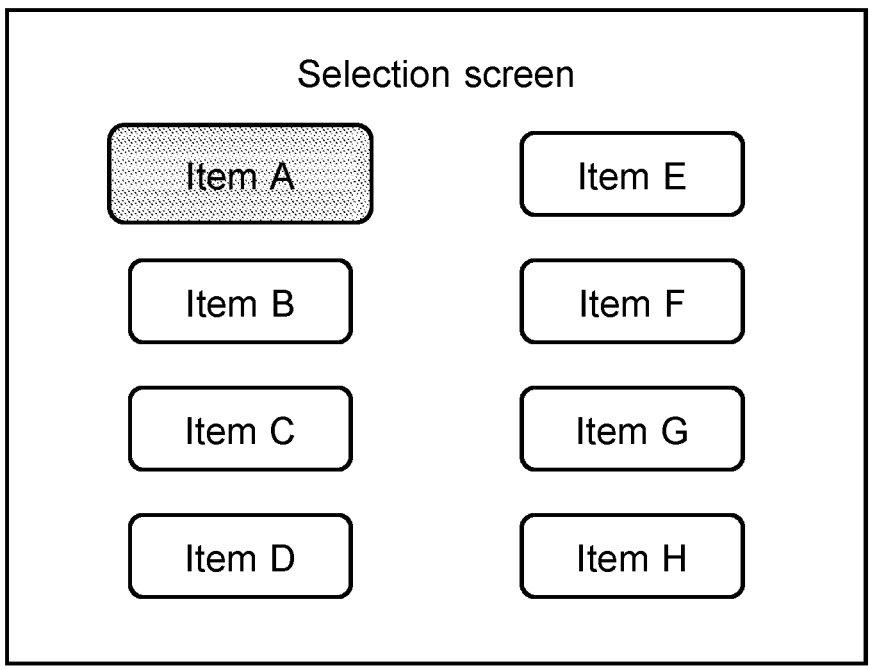

FIG. 7A shows an example of a screen displaying buttons that are a plurality of GUI components. FIG. 7B shows an example of the screen where a button "Item A" is focused on. As shown in FIG. 7A, eight buttons from "Item A" to "Item H" are aligned in two columns on the screen.

The input detection unit 101 has a function to detect primary input and secondary input to each of the plurality of buttons displayed on the screen. In the embodiment, the primary input is to select one of the plurality of buttons, and the secondary input is to confirm the selection of a button. In an example described here, the input detection unit 101 detects input given through the touch panel 13, as well as through the right button 33, the down button 34, the up button 35, and the left button 36 (hereinafter collectively referred to as the "directional buttons") and the A button 53. In other words, input is given through two types of input apparatuses, the touch panel 13 and the hardware buttons (the directional buttons and the A button 53).

While the directional buttons and the A button 53 are cited above as examples of hardware input apparatuses, hardware input apparatuses are not limited to them. For example, the analog stick 32 or 52 may be used as a hardware input apparatus instead of the directional buttons. When the analog stick 32 or 52 is used, the primary input may be detected by the tilt of the analog stick 32 or 52 and the secondary input may be detected by the A button 53. Alternatively, when the analog stick 32 or 52 is used, the secondary input may be detected by the pressing of the analog stick 32 or 52 instead of the A button 53.

When input is given through the touch panel 13, the input detection unit 101 detects the primary input when the coordinates of a touch input become included in one of the plurality of buttons' own areas. The input detection unit 101 detects the secondary input when a touch input ends while the coordinates of the touch input are in a button's display area. Note that the end of a touch input is the end of a touch on the touch panel 13 (e.g., the release of a finger or stylus from the touch panel 13), and the shift of the coordinates of a touch input out of a button's display area during the touch input is not deemed to be the end of the touch input, FIG. 7B shows an example of the screen where the primary input to the button "Item A" is detected. The focus change unit 104 has performed a focus change step on the button "Item A," and is displaying it visually differently from unfocused buttons. Specifically, the display area of the button "Item A" is made slightly larger than the other button display areas, and the color of the display area of the button "Item A" is made different from that of the other button display areas. While a mode in which the size and the color are changed is cited here, the focus change unit 104 may make a focused button visually different from unfocused buttons in another mode. For example, the focus change unit 104 may change only the size or the color, or may point a cursor at a focused button.

When input is given through the hardware buttons, the input detection unit 101 detects the primary input by the directional buttons, and detects the secondary input by the A button 53. First, the primary input will be described. A default button for the first push of a directional button is predetermined among the plurality of buttons. When one of the directional buttons is pushed on the selection screen, the input detection unit 101 first detects the primary input to the default button, and then detects the primary input to a button that is in the direction indicated by a directional button.

A description will be made with reference to FIGS. 7A and 7B. When a directional button is pushed on the selection screen shown in FIG. 7A, the primary input to the button "Item A" is detected. This causes a state in which the button "Item A" is focused on as shown in FIG. 7B.

Pushing a directional button in the state shown in FIG. 7B causes the input detection unit 101 to detect the primary input to a button that is in the directional button's direction. For example, pushing the down button 34 causes the detection of the primary input to the button "Item B" that is below the button "Rem A." Pushing the right button in the state shown in FIG. 7B causes the detection of the primary input to the button "Item E" that is to the right of the button "Rem A."

The order of the plurality of buttons is preset (in alphabetical order in the example shown in FIGS. 7A-7B), and pushing the down button 34 causes the primary input to be detected according to the order. For example, pushing the down button 34 in a state where the primary input to the button "Item D" has been detected causes the detection of the primary input to the button "Item E," and pushing the down button 34 in a state where the primary input to the button "Item H" has been detected causes the detection of the primary input to the button "Item A." Therefore, holding down the down button 34 causes the successive detection of the primary input to each of the plurality of buttons displayed on the selection screen. Note that pushing the up button 35 causes the primary input to be detected in reverse order of the above. This configuration allows the primary input to be given successively at short detection intervals by holding down the down button 34 or the up button 35.

Next, the secondary input given through the hardware buttons will be described. The input detection unit 101 detects the secondary input by the A button 53. If the A button 53 is pushed in a state where the primary input given by a directional button has been detected and one of the plurality of buttons has been selected, the input detection unit 101 detects the secondary input to the button.

The operation sound output unit 102 has a function to output an operation sound in time with the primary input to each of the plurality of buttons. The operation sound has a role to indicate that the primary input has been given to a button. Therefore, the timing of outputting the operation sound just has to be matched with the timing of the primary input. The operation sound is a brief sound that can be heard for a moment. The timbre of it may be the same for all the plurality of buttons, or may be different from button to button. For example, different instrument sounds may be used for different buttons.

The operation sound output unit 102 raises the pitch of the output operation sound higher when the primary input to different buttons is successively detected and as the detection interval of the primary input becomes shorter. The process performed by the operation sound output unit 102 will be described in detail later.

When the input detection unit 101 detects the secondary input, the process execution unit 103 performs a process of causing a transition to a screen assigned to the relevant button. The process of causing a transition to a screen assigned to a button is a GUI-component-assigned process that is performed by confirming the selection of a button which is a GUI component.

Figure 8A:
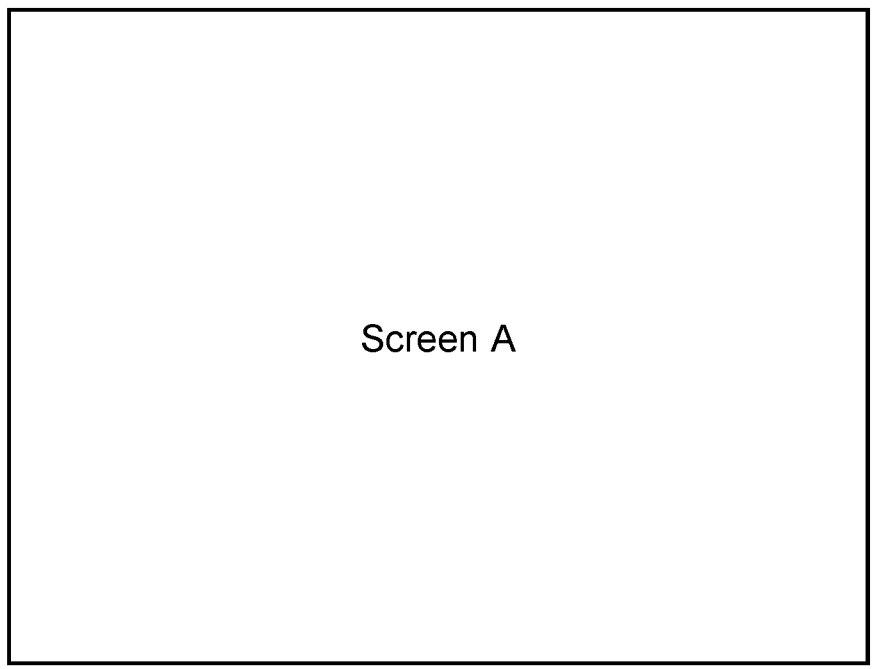
FIG. 8A shows an example in which the screen has transitioned to Screen A.
Figure 8B:
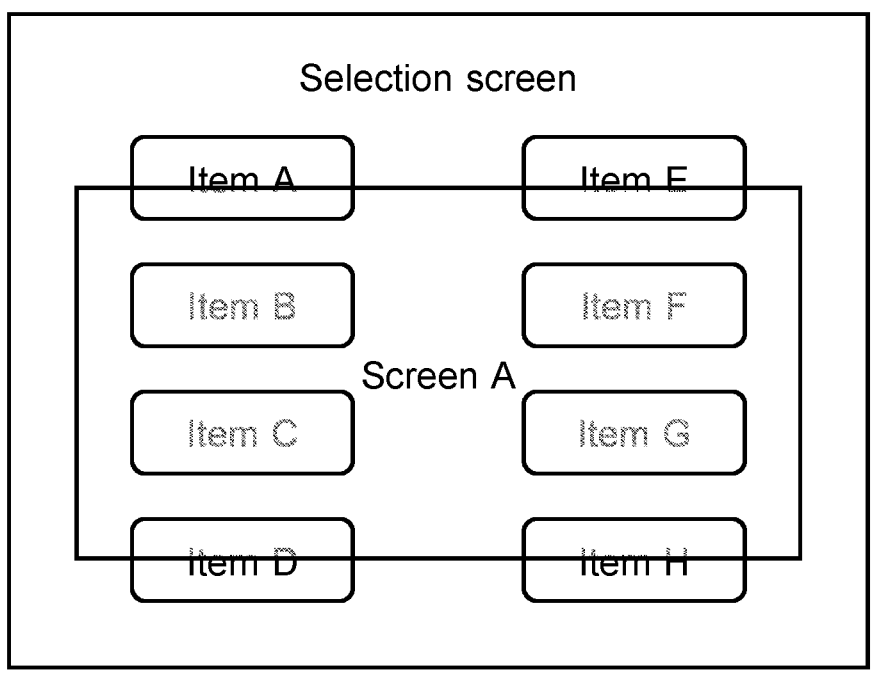
FIG. 8B shows an example in which Screen A pops up and is superimposed.

FIG. 8A shows an example in which the selection of the button "Item A" has been confirmed and the screen has transitioned to Screen A that is assigned to "Item A," and FIG. 8B shows an example in which Screen A pops up and is superimposed. The process execution unit 103 may clear the selection screen and display Screen A as shown in FIG. 8A, or may cause Screen A to pop up and be superimposed on the selection screen as shown in FIG. 8B. The game system 1 then allows input to Screen A, but disallows input to the plurality of buttons on the selection screen. Whether the process execution unit 103 causes a complete transition to the next screen as shown in FIG. 8A or overlays another window on the selection screen can be determined in accordance with the contents of the selection screen and next screen.

While cited above is an example in which input to the selection screen is not accepted after the execution of the process assigned to "Item A" has caused a transition to Screen A, input to buttons displayed on the selection screen may be allowed even after a process assigned to a button has been executed. An example of this is a case in which a process assigned to a button is to show a preview of the selected component. An example will be described in the following.

Figure 9A:
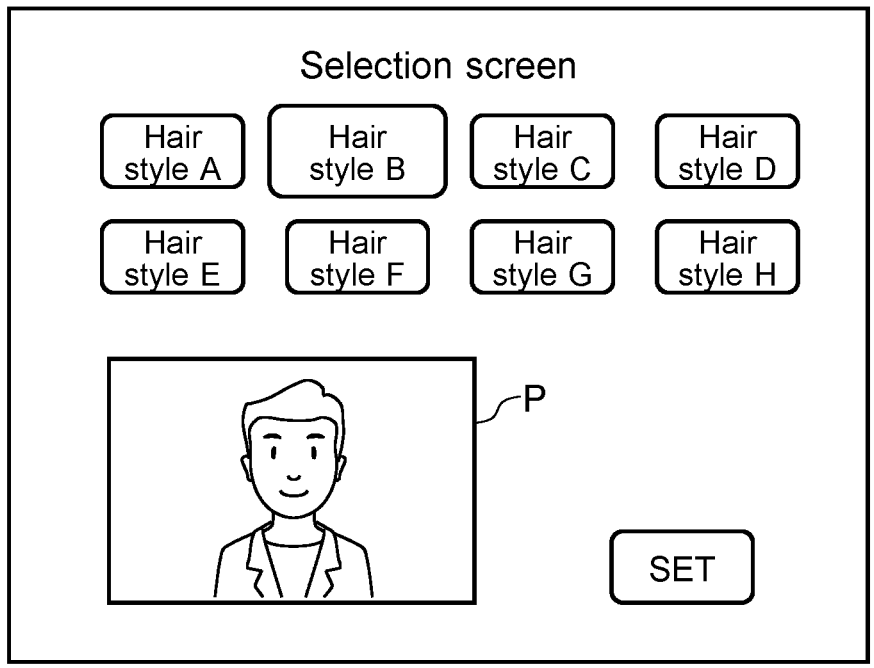
FIG. 9A is a selection screen for selecting a hairstyle for a character.

FIG. 9A is a selection screen for selecting a hairstyle for a character. Buttons indicating "Hairstyle A" through "Hairstyle H" are aligned in two rows in FIGS. 9A and 9B. In this example, the buttons are aligned horizontally in alphabetical order. The order of the buttons are preset in the alphabetical order. Therefore, the right button 33 or the left button 36 is the button to hold down in order to successively give the primary input when input is given through the directional buttons.

In the screen shown in FIG. 9A, the primary input to the button "Hairstyle B" is detected and the button "Hairstyle B" is focused on. A character with the current hairstyle, Hairstyle A, is displayed in a preview window P. As just described, when the primary input is detected, the display mode of the relevant button changes but the display in the preview window P is not changed from the current hairstyle.

Figure 9B:
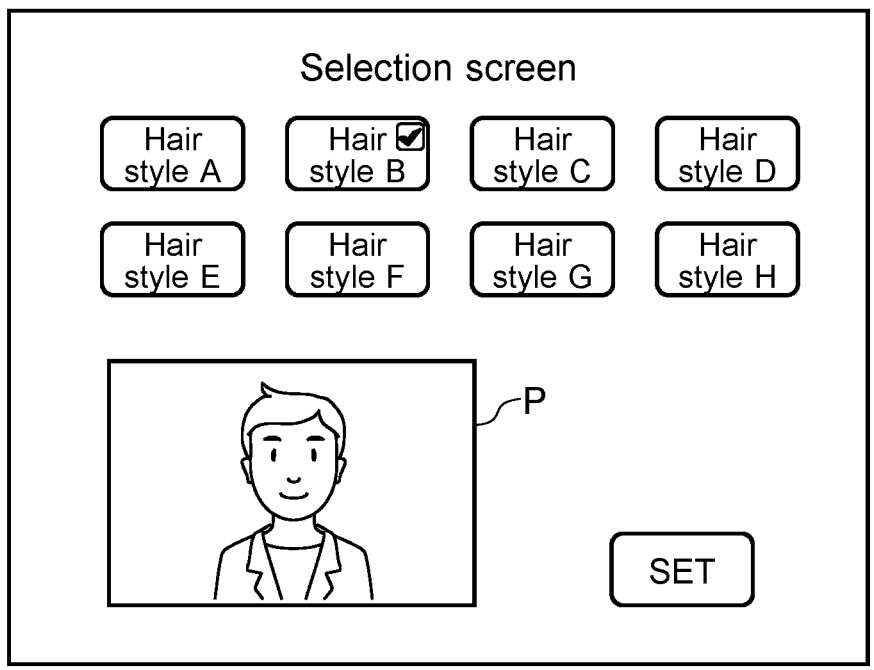
FIG. 9B shows an example of the screen where "Hairstyle B" is selected.

FIG. 9B shows a screen where the secondary input to the button "Hairstyle B" has been detected. As illustrated, a check mark is displayed for the button "Hairstyle B," and the character with Hairstyle B is displayed in the preview window P. The process of displaying the character with selected Hairstyle B in the preview window P is the process assigned to the button "Hairstyle B." In this way, an operation can be performed on "Hairstyle A" through "Hairstyle H" even on the screen where the process assigned to the button "Hairstyle B" has been executed. In order to confirm this Hairstyle B displayed in the preview window P, a button "SET" should be pushed.

Figure 10:
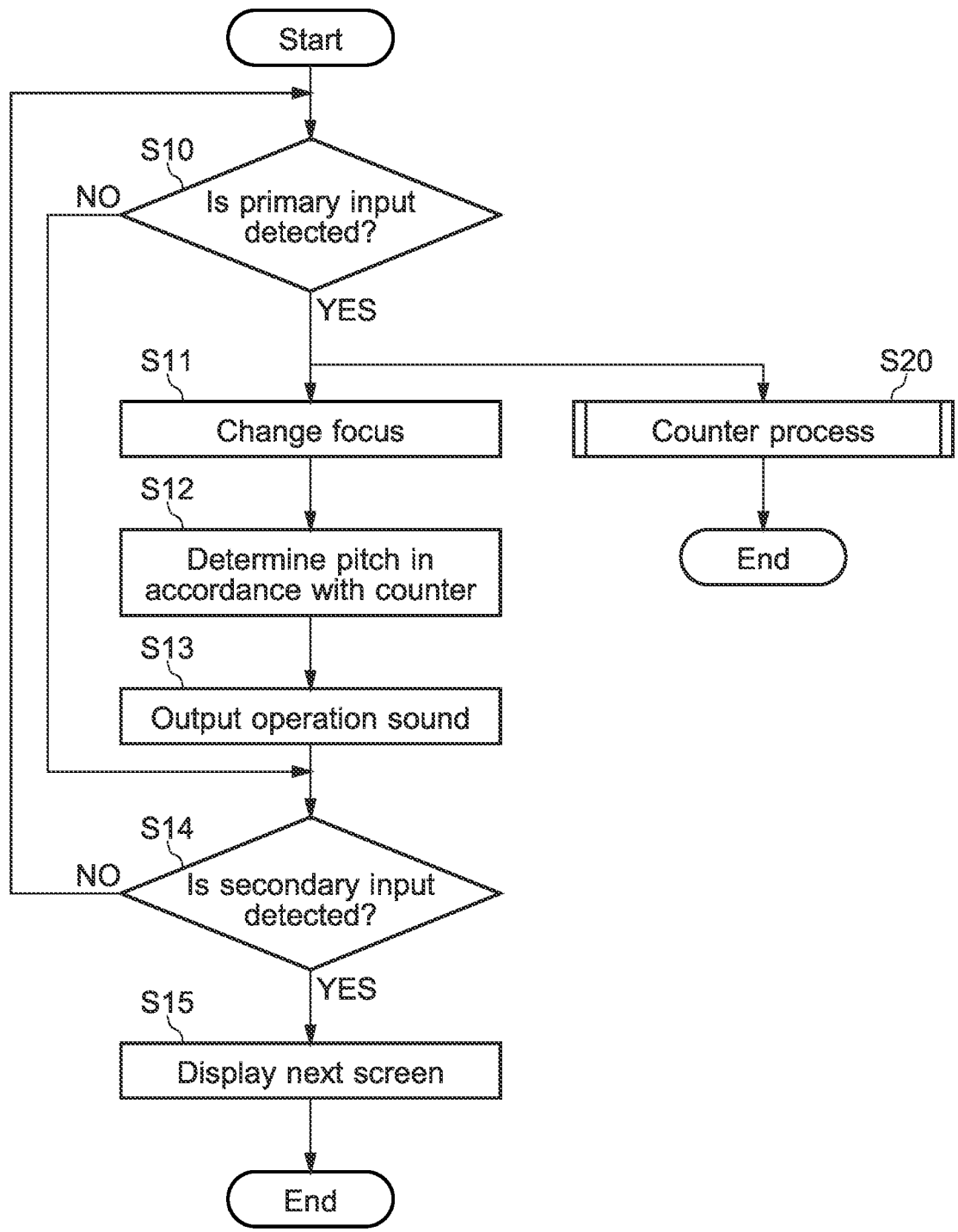
FIG. 10 is a flowchart showing an operation of the game system of the embodiment.

FIG. 10 is a flowchart showing an operation of the game system 1 of the embodiment. While displaying the selection screen having the plurality of buttons (see FIG. 7A), the game system 1 waits for the primary input and the secondary input to be detected. Specifically, the game system 1 determines whether the primary input is detected or not (S10) and, if the primary input is not detected (NO at S10), determines whether the secondary input is detected or not (S14). If the secondary input is not determined to be detected as a result (NO at S14), the operation returns to the step of detecting the primary input (S10). Repeating this, the game system 1 waits for the detection of the primary input and the secondary input.

If the input detection unit 101 detects the primary input (YES at S10), the game system 1 executes a counter process (S20), changes the focus (S11), and determines the pitch in accordance with the counter (S12). The counter just mentioned is a variable whose value is determined in accordance with the detection interval of the primary input. The counter counts from 0 to 120. The operation sound output unit 102 sets the pitch of the operation sound higher as the counter value increases. The game system 1 concurrently executes the counter process of determining the counter value and the process of outputting the operation sound or the like on different tracks.

Figure 11:
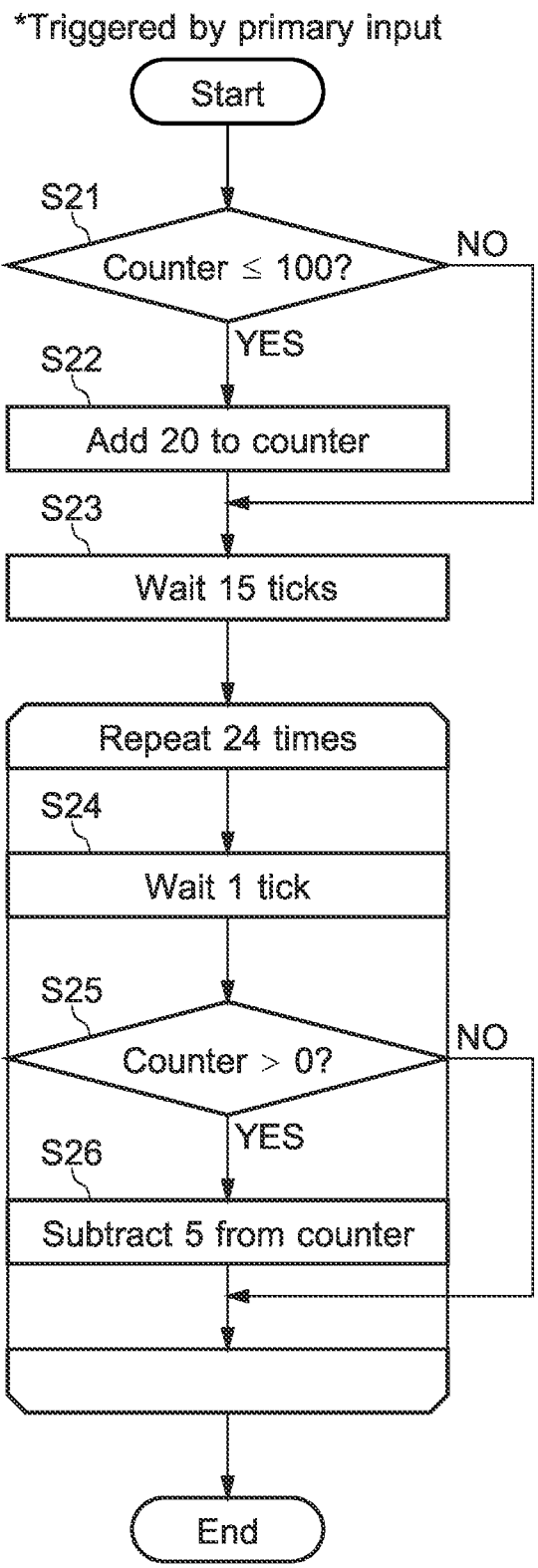
FIG. 11 is a flowchart showing an operation of a counter process.

FIG. 11 is a flowchart showing an operation of the counter process executed by the operation sound output unit 102. The counter process is triggered by the detection of the primary input. Note that if the primary input is detected while the counter process shown in FIG. 11 is being executed, the counter process is executed from the start.

If the primary input is detected, the operation sound output unit 102 determines whether or not the counter is equal to or less than 100 (S21). If the counter is equal to or less than 100 (YES at S21), the operation sound output unit 102 performs a step of adding 20 to the counter (S22). If the counter is not equal to or less than 100 (NO at S21), the operation sound output unit 102 skips the counter addition step since the counter would exceed its upper limit if 20 was added to the counter. The operation sound output unit 102 then waits 15 ticks (S23), and performs counter subtraction steps (S24 to S26). Note that one tick varies depending on the tempo at which an effect sound is played, and is 1/96 seconds when the tempo is 120.

In the counter subtraction steps, the operation sound output unit 102 waits one tick (S24), and determines whether the counter is greater than zero or not (S25). If the counter is determined to be greater than zero as a result of the determination (YES at S25), the operation sound output unit 102 performs a step of subtracting five from the counter (S26). If the counter is less than five, the counter is set to zero since the counter would fall below its lower limit if five was subtracted from the counter.

If the counter is not greater than zero (NO at S25), subtraction from the counter is no longer possible, and then the operation sound output unit 102 skips the step of subtracting from the counter (S26). In other words, the counter subtraction steps are not performed if the counter is not greater than zero. The step of subtracting five from the counter for each one tick in this way is repeated 24 times in the counter subtraction steps. Consequently, even if the counter is at its maximum before the start of the subtraction steps, the counter value becomes zero 24 ticks after the start of the subtraction steps.

As mentioned at the start, however, when the input detection unit 101 detects the primary input, the operation sound output unit 102 returns to the first step (S21) and executes the counter process even if it is in the middle of the flow shown in FIG. 11. This means that the counter process goes back to the start before the counter becomes zero if the detection interval of the primary input is short, and therefore the counter value becomes increasingly high when the primary input is detected at short detection intervals. For example, if the detection interval is shorter than or equal to 15 ticks, 20 is added to the counter (322), the next primary input is detected during the 15-tick wait, the process returns to the start, and therefore the next 20 is added to the counter (S21 to S22) without the subtraction steps.

The shorter the detection interval becomes, the larger the degree of increase of the counter becomes. For example, the counter increases by 20 if the detection interval is 15 ticks, and increases by 10 if the detection interval is 17 ticks. The counter thus increases more as the detection interval of the primary input becomes shorter, since the degree of subtraction decreases. In other words, the operation sound output unit 102 outputs the operation sound at a higher pitch as the detection interval of the primary input becomes shorter.

Conversely, if the detection interval of the primary input becomes longer when the pitch is high, subtraction is performed on the counter through the counter subtraction steps (S24 to S26). For example, if the primary input is detected after the counter subtraction steps have been repeated five times or more and 25 or more has been subtracted, the counter value becomes smaller than the last time the operation sound was output even though 20 is added to the counter (S22), and therefore the pitch becomes lower than the previous operation sound. In this way, the pitch of the output operation sound becomes gradually lower if the detection interval of the primary input becomes longer.

Returning to FIG. 10, the process of outputting the operation sound will be described. While concurrently executing the counter process on a different track, the game system 1 performs the step of changing the focus to focus on a button on which the primary input has been newly detected (S11). The game system 1 then determines the pitch of the operation sound in accordance with the counter (S12). The operation sound output unit 102 outputs the operation sound at the determined pitch (S13). Note that the change of focus (S11) and the outputting of the operation sound (S12 and S13) may be performed in reverse order.

The operation sound output unit 102 lowers the increase rate of the pitch of the operation sound when the primary input is given through the hardware buttons (the directional buttons, and the analog sticks 32 and 52) compared to when it is given through the touch panel 13. The rate of changing the pitch may be adjusted, for example, by performing the addition of 10 instead of the addition of 20 in the count-up step (S22) in the counter process. The method of adjusting the rate of changing the pitch is not limited to this. For example, the waiting times (S23 and S24) may be lengthened. The operation sound output unit 102 may output the operation sound whose timbre is different between when the primary input is given by touch input and when the primary input is given by button input through the hardware buttons.

The game system 1 determines whether the secondary input is detected or not (S14). If the secondary input is detected (YES at S14), the game system 1 transitions to a screen indicated by the button to which the secondary input was given, and displays the transition destination screen (S15). If the secondary input is not detected (NO at S14) and the primary input is detected (YES at Si 0), the game system 1 executes the counter process (S20) to update the counter value as well as determines the pitch in accordance with the counter (S12), and outputs the operation sound (S13). In this way, the game system 1 repeatedly performs the focus change step and the process of outputting the operation sound (S11 to S13, and S20) based on the detection of the primary input until the secondary input is detected (YES at S14).

The information processing program of the embodiment can improve the operational feeling since the pitch of the operation sound becomes higher when the primary input is successively given to each of the plurality of buttons. A screen having a plurality of buttons exists for the push of buttons, and therefore it is conventionally thought that an operation sound is output in order to confirm that a button has been pushed. In contrast, the information processing program of the embodiment allows the operation sound to be output at different pitches by sliding a touching finger to rapidly switch between pushed buttons or by moving a cursor. "A play element" is provided to the interface for selecting buttons, and its operation becomes fun. The primary input in the embodiment corresponds to selection before confirmation of the execution of a button. This means that a user hears an operation sound with a varying pitch instead of a monotonous operation sound while the user is wondering which screen to transition to, and therefore the user can operate pleasantly.

While a non-transitory storage medium having an information processing program stored therein, an information processing apparatus, and an information processing method of the invention have been described in detail above with an embodiment, the invention's non-transitory storage medium having an information processing program stored therein is not limited to the above-described embodiment.

The above embodiment has been illustrated with the game system 1 which has two types of input apparatuses that use touch input and button input using hardware buttons, but only touch input or only button input using hardware buttons may be used for an input apparatus. Not just touch input and hardware button input but also, for example, motion input using an accelerometer and a gyroscope sensor or camera input may be used for an input apparatus. If camera input is used, the primary input and the secondary input can be given through gestures or the like by detecting the body motion of a user. Moreover, the primary input and the secondary input may be accepted through a voice command from a user by using microphone input.

While the above embodiment has been described with the example in which the counter is used for the process of raising the pitch of the output operation sound higher as the detection interval of the primary input becomes shorter, there may be various algorithms other than the above embodiment as to how to determine the pitch based on the detection interval, and such algorithms are also included in the scope of the invention.

Figure 12:
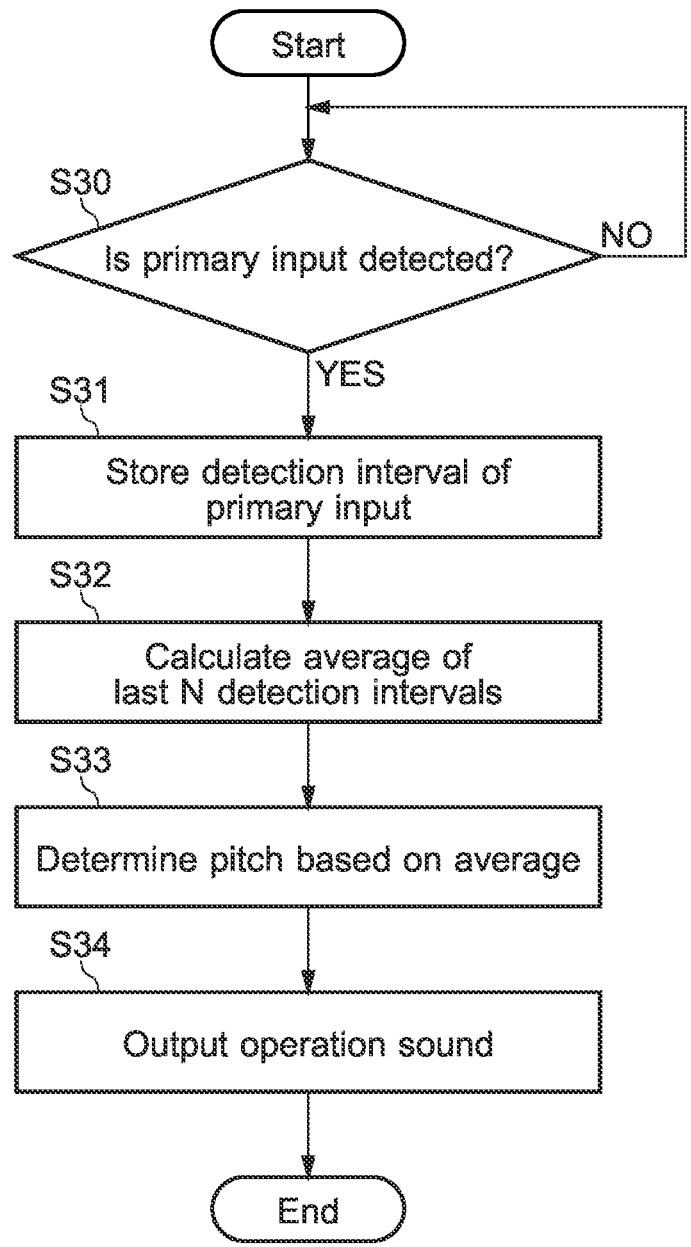
FIG. 12 is a flowchart showing a process of determining pitch by means of an operation sound output unit.

FIG. 12 is a flowchart showing a process of determining the pitch by means of the operation sound output unit. The operation sound output unit determines whether the primary input is detected or not (S30) and, if the primary input is not detected (NO at S30), waits for the detection of the primary input. If the primary input is detected (YES at S30), the detection interval of the primary input is stored (S31). Data of the last N detection intervals is cyclically stored here, and the previous data is erased.

The operation sound output unit then calculates the average of the last N detection intervals (S32) and, on the basis of the calculated average detection interval, determines the pitch of the operation sound so that it becomes higher as the average detection interval becomes smaller (S33). The operation sound output unit outputs the operation sound at the determined pitch (S34).

This configuration allows the pitch of the operation sound to be raised as the detection interval becomes shorter. While the average of the last N detection intervals is taken in the example shown in FIG. 12, a representative value of the last N detection intervals may be determined. For example, the representative value may be the mode of the data of the last N detection intervals. Alternatively, a weighted average may be calculated after the data is weighted so that more recent data is weighted more heavily. Specifically, let $d_1, \ldots, d_N$ dry be detection intervals of the primary input lined up in reverse order starting from the last one, let $\alpha_1, \ldots, \alpha_N$ be weights ($\alpha_1 > \alpha_2 \ldots > \alpha_N$), and a representative value of the detection intervals, d, is determined by the following formula.

$$d = (\alpha_1 \times d_1 + \alpha_2 \times d_2 + \ldots + \alpha_N \times d_N)/N$$

If N=1 is set, the pitch can be determined based on the detection interval between the last primary input and the previous one. This setting allows the pitch of the operation sound to sensitively respond to the detection interval of the primary input.

Alternatively, the detection interval of the primary input may be classified into several classes, and the pitch may be determined for each class. For example, the detection interval of the primary input of: less than 15 ticks may be classified as Class 1; 15 ticks or more and less than 20 ticks may be classified as Class 2; 20 ticks or more and less than 25 ticks may be classified as Class 3; 25 ticks or more and less than 30 ticks may be classified as Class 4; and 30 ticks or more may be classified as Class 5, and the pitch may be determined in accordance with the class. Specifically, the smaller the number of the class is, the higher the pitch is determined to be.

While the above embodiment has been described with the example in which the operation sound is output at a higher pitch as the detection interval of the primary input becomes shorter, another parameter than the pitch may be changed. To be specific, the volume or timbre of the operation sound may be changed as the detection interval of the primary input becomes shorter.

Alternatively, instead of raising the pitch higher i.e., increasing the frequency) as the detection interval of the primary input becomes shorter, effect sounds of different pitches may be prepared in advance and may be output in sequence so that the pitch becomes higher. The effective sounds of different pitches may have different timbres in addition to the pitches. Moreover, the effect sounds to be prepared may constitute musical composition data comprising their respective pitches. This allows the musical composition data to be output to play a melody in accordance with the successively detected primary input.

While the selection screen displaying buttons has been described with FIGS. 7A-7B in the above embodiment, the game system may have a plurality of selection screens. The timbre of the operation sound to be output at the time of the detection of the primary input may be made different for each selection screen in this case. In addition to this, the rate of raising the pitch may be made different in accordance with the timbre. Such a method of changing the timbre may be applied to buttons arranged on one screen. For example, the rate of changing the timbre or pitch of the operation sound may be made different between a button group of "Item A" through "Item D" and a button group of "Item E" through "Item H" shown in FIG. 7A.

While the above embodiment has been described with the example in which the primary input to each of the plurality of buttons is detected and the operation sound is output at a higher pitch as the detection interval of the primary input becomes shorter, the operation sound may be output at a higher pitch when the primary input to one button is successively detected and as the detection interval of the primary input becomes shorter. When input is given by touch input, the primary input to one button is successively detected by the touching finger being moved inside and outside the button's display area and back and forth across the border of the area. The operation sound is then output at a higher pitch as the detection interval becomes shorter.

In other words, a non-transitory storage medium according to one aspect may have an information processing program stored therein, and the information processing program may be executed in a computer of an information processing apparatus and may cause the computer to function as: input detection means for detecting primary input and secondary input to a GUI component; operation sound output means for outputting an operation sound in time with the primary input to a GUI component; and process execution means for, when the secondary input to a GUI component to which the primary input has been given is detected, executing a GUI-component-assigned process that is assigned to the GUI component and is different from the outputting of the operation sound, where the operation sound output means may output the operation sound at a higher pitch as a detection interval of the primary input to one GUI component becomes shorter.

While the above embodiment has been described with the example in which the operation sound is output at a higher pitch as the detection interval of the primary input becomes shorter, the operation sound may be output instead at a lower pitch as the detection interval of the primary input becomes shorter.

In other words, a non-transitory storage medium according to one aspect may have an information processing program stored therein, and the information processing program may be executed in a computer of an information processing apparatus and may cause the computer to function as: input detection means for detecting primary input and secondary input to each of a plurality of GUI components; operation sound output means for outputting an operation sound in time with the primary input to one of the plurality of GUI components; and process execution means for, when the secondary input to the GUI component to which the primary input has been given is detected, executing a GUI-component-assigned process that is assigned to the GUI component and is different from the outputting of the operation sound, where the operation sound output means may output the operation sound at a lower pitch as a detection interval of the primary input to different GUI components of the plurality of GUI components becomes shorter.

The invention claimed is:

1. A non-transitory storage medium having an information processing program stored therein, the information processing program executed in a computer of an information processing apparatus and causing the computer to provide execution comprising:
   detecting primary input and secondary input to each of a plurality of GUI components;
   outputting an operation sound in time with the primary input to one of the plurality of GUI components; and
   executing, when the secondary input to the GUI component to which the primary input has been given is detected, executing a GUI-component-assigned process that is assigned to the GUI component and is different from the outputting of the operation sound,
   the operation sound output means outputs the operation sound is output at a higher pitch as a detection interval of the primary input to different GUI components of the plurality of GUI components becomes shorter.

2. The non-transitory storage medium according to claim 1,
   wherein the primary input and the secondary input are both made by a touch input, and
   wherein the primary input is detected when coordinates of the touch input become included in one of the plurality of GUI components' own areas, and the secondary input is detected when coordinates of the touch input at an end thereof are included in one of the plurality of GUI components' own areas.

3. The non-transitory storage medium according to claim 1, wherein
   the primary input and the secondary input are both made by actuating a hardware component, and
   the computer is caused to provide further execution comprising changing, when the primary input is detected, the GUI component to be focused on among the plurality of GUI components as well as displaying the focused GUI component visually differently from an unfocused GUI component.

4. The non-transitory storage medium according to claim 1, wherein
   a Type 1 input given by using a first input apparatus is detected and a Type 2 input given by using a second input apparatus is detected, and
   the operation sound that is different in at least one of pitch and timbre is output between when the primary input of Type 1 based on the Type 1 input is detected and when the primary input of Type 2 based on the Type 2 input is detected.

5. The non-transitory storage medium according to claim 4, wherein the Type 1 input includes a touch input and the Type 2 input is made by actuating a hardware component.

6. The non-transitory storage medium according to claim 5, wherein the operation sound is output at a lower pitch when the primary input of Type 2 is detected compared to when the primary input of Type 1 is detected at the detection interval equal to that of the primary input of Type 2.

7. The non-transitory storage medium according to claim 6, wherein the primary input to each of the plurality of GUI components is successively detected when one operation is continued in the input given by actuating a hardware component.

8. The non-transitory storage medium according to claim 1, wherein the screen is changed to a state in which no input is allowed to be given to the GUI component, as the GUI-component-assigned process.

9. The non-transitory storage medium according to claim 8, wherein when the secondary input to one of the plurality of GUI components is detected, the screen on which the GUI component is placed is caused to transition to another screen so as to change the screen to a state in which no input is allowed to be given to the GUI component.

10. The non-transitory storage medium according to claim 8, wherein when the secondary input to one of the plurality of GUI components is detected, another screen is overlaid on a layer in which the GUI component is placed so as to change the screen to a state in which no input is allowed to be given to the GUI component.

11. The non-transitory storage medium according to claim 1, wherein upon detecting the primary input, a counter process is executed where the pitch is determined in accordance with a counter value.

12. The non-transitory storage medium according to claim 11, wherein the counter includes a variable whose value is determined in accordance with the detection interval of the primary input to different GUI components.

13. An information processing apparatus, comprising:
   a processor; and
   a memory configured to store computer readable instructions that, when executed by the processor, cause the information processing apparatus to:
   detect primary input and secondary input to each of a plurality of GUI components;
   output an operation sound in time with the primary input to one of the plurality of GUI components; and execute, when the secondary input to the GUI component to which the primary input has been given is detected, a GUI-component-assigned process that is assigned to the GUI component and is different from the outputting of the operation sound, wherein the operation sound is output at a higher pitch as a detection interval of the primary input to different GUI components of the plurality of GUI components becomes shorter.

14. An information processing method for outputting an operation sound in time with an input to a GUI component, the information processing method comprising:

detecting primary input and secondary input to each of a plurality of GUI components;

outputting an operation sound in time with the primary input to one of the plurality of GUI components; and executing, when the secondary input to the GUI component to which the primary input has been given is detected, a GUI-component-assigned process that is assigned to the GUI component and is different from the outputting of the operation sound, wherein the operation sound is output at a higher pitch as a detection interval of the primary input to different GUI components of the plurality of GUI components becomes shorter.

* * * * *